United States Patent [19]

Braun et al.

[11] 4,055,898
[45] Nov. 1, 1977

[54] MEANS FOR FACILITATING CHECKING AND REPLENISHMENT OF CRANKCASE OIL IN A SMALL ENGINE

[75] Inventors: Daniel E. Braun, Brookfield; Patrick J. Bruener, West Allis, both of Wis.

[73] Assignee: Briggs & Stratton Corporation, Wauwatosa, Wis.

[21] Appl. No.: 686,146

[22] Filed: May 13, 1976

[51] Int. Cl.² ............................................. G01F 23/04
[52] U.S. Cl. .......................... 33/126.4 R; 33/126.7 R
[58] Field of Search ................... 33/126.4 R, 126.7 R; 116/118 R; 73/323, 334

[56] References Cited

U.S. PATENT DOCUMENTS

| | | | |
|---|---|---|---|
| 1,981,270 | 11/1934 | Hollingsworth | 33/126.7 R |
| 2,043,877 | 6/1936 | Ashworth | 116/118 R |
| 2,363,424 | 11/1944 | Keenan | 33/126.7 R X |
| 2,705,372 | 4/1955 | Cornell | 33/126.7 R |
| 3,103,816 | 9/1963 | Kawecki | 73/323 |

FOREIGN PATENT DOCUMENTS 73,214   9/1960   France .......................... 33/126.4 R

*Primary Examiner*—Charles E. Phillips
*Attorney, Agent, or Firm*—Ira Milton Jones & Associates

[57] ABSTRACT

A small gasoline engine with a relatively inaccessible crankcase oil fill port is equipped with an elongated funnel member having its bottom sealingly secured in that port. A removable cap for the funnel member comprises a suction chamber having a transparent side wall and the interior of which is communicated with a depending tube that has its bottom end at the prescribed minimum oil level. With adequate crankcase oil, depression and release of a downwardly displaceable, upwardly biased top wall of the suction chamber draws oil into it to be visible through its transparent wall. The interior of the transparent wall is cleaned of residual oil by a wiper moving in unison with the displaceable wall.

11 Claims, 3 Drawing Figures

U.S. Patent  Nov. 1, 1977  4,055,898
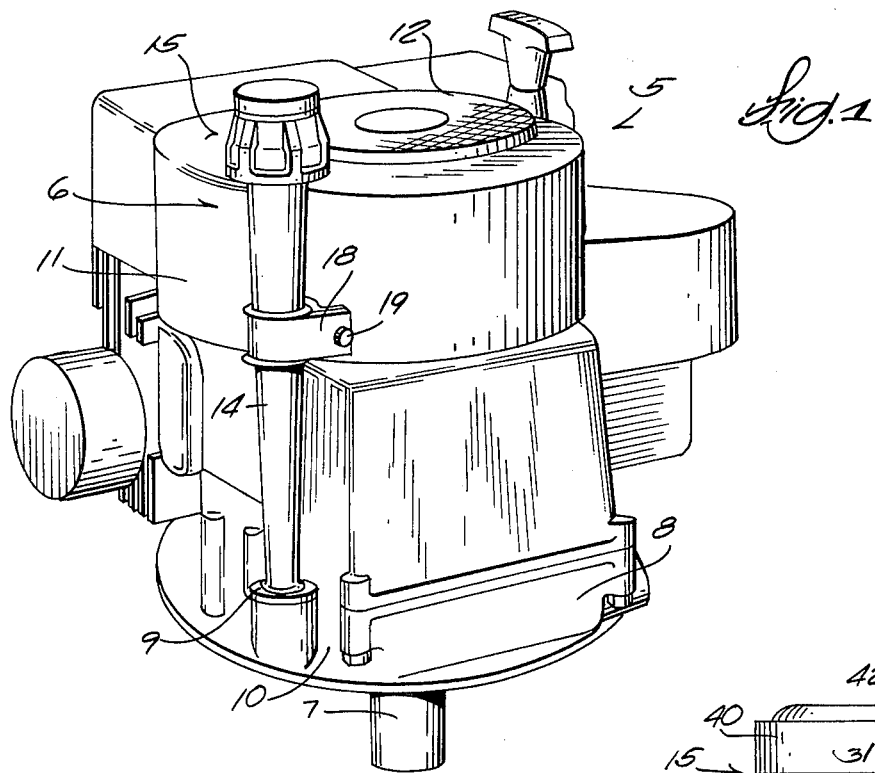
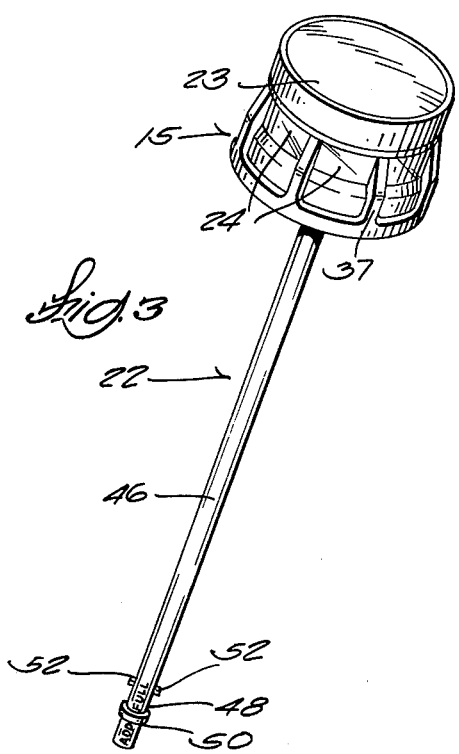
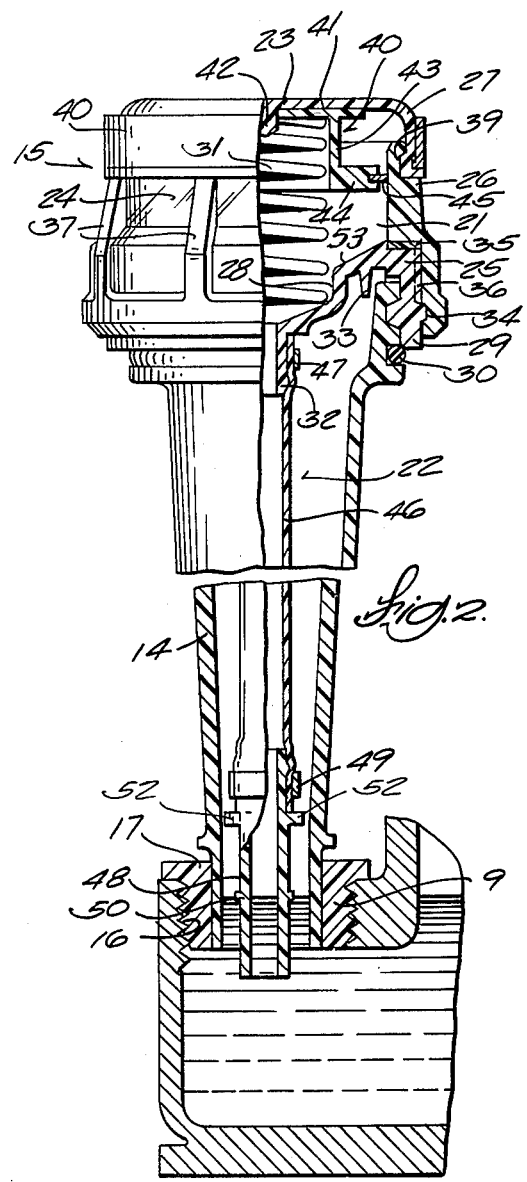

MEANS FOR FACILITATING CHECKING AND REPLENISHMENT OF CRANKCASE OIL IN A SMALL ENGINE

This invention relates generally to small engines such as are used for powering lawn mowers, snow blowers, riding tractors and the like; and the invention is more particularly concerned with means for facilitating replenishment of crankcase oil in such engines and for enabling the level of oil in the crankcase to be readily checked.

It is well known that the oil level should be checked before every start-up of a single-cylinder gasoline engine having a crankcase oil reservoir, but heretofore it has often been so inconvenient to make the oil check as to discourage its accomplishment. The oil fill port or inlet in the engine crankcase was usually closed by a screw threaded-plug that was located in a low corner of the engine body where access to it was difficult. Dirt and grime tended to accumulate around that port and had to be cleaned away before the plug was removed, to ensure that none of it fell into the crankcase. After the plug was removed the oil in the crankcase was hard to see if lighting conditions were not favorable, owing to the relatively inaccessible location of the oil fill port.

If the oil level was found to be low, further inconveniences were encountered in filling oil into the crankcase. The fill port was too small to receive oil poured directly into it from a container, and because of closely adjacent upright engine structure a conventional funnel inserted into the fill port would be tilted at such a low angle that oil poured into it was about as likely to spill onto the ground as to flow into the crankcase.

Of course these inconveniences were all due to the location of the oil fill port in the crankcase, but that location is controlled by structural and functional requirements and there seems to be no way to change it, at least without a major and very expensive redesign of engine bodies. For many years, therefore, the inconveniences were accepted as unavoidable.

One expedient that has been devised to facilitate checking the oil supply of a small engine is a bellows-type gage such as is disclosed in U.S. Pat. No. 3,103,816, to E. Kawecki. It comprises a short transparent tube that replaces the plug in the oil fill port and has a small bellows at its upper end. The oil level is checked by squeezing the bellows and then releasing it. Since the bottom of the tube is at the minimum prescribed oil level, such actuation of the bellows causes oil to be sucked up into the transparent tube if the oil supply in the crankcase is adequate. If crankcase oil is below the prescribed level, no oil will be visible in the tube.

That bellows gage was located down in a corner of the engine body where it was not as easily seen as might be desired, but it did facilitate checking the oil level. However, it did not eliminate the major inconveniences involved in replenishment of the oil supply. That problem has been attacked by equipping some small engines with a funnel-like filler tube that was mounted in the filler port and projected up to a level slightly above the nearby engine structure. At its upper end this filler tube was wide enough to receive oil poured directly from a container.

While greatly facilitating replenishment of the oil supply, the filler tube contributed new and different inconveniences to checking of the oil level. Because of it, the oil in the crankcase could not be seen directly, and therefore the oil level had to be checked with a dipstick that was usually provided as standard equipment, calibrated for the particular engine and anchored to a cap that closed the top of the filler tube. When withdrawn from the filler tube, the dipstick was likely to carry a gob of oil that threatened to drop onto shoes or clothing. If the engine had been running shortly before the oil check, splashed oil had to be wiped off and the dipstick had to be fully reinserted and withdrawn for an accurate check of oil level. This meant that finding a reasonably clean rag or the like was often a necessary preliminary to an oil level check.

The inconveniences attending the use of a dipstick are perhaps more psychological than physical. But the maintenance of an adequate oil supply in an engine crankcase is so important that every encouragement should be given to routine and conscientious checking of oil level before each engine operation, and it is at least equally important to facilitate replenishment of the oil so that it will be kept at the prescribed level.

With this in mind it is the general object of the present invention to provide structure which serves as a compact but convenient and readily accessible funnel that is more or less permanently attached to a small gasoline engine for enabling oil poured from a container to be guided directly into the crankcase of the engine, and which also provides for an unambiguous and readily visible indication of whether or not oil in the crankcase is up to the prescribed level without any necessity for opening the oil inlet to the crankcase.

It is also an object of this invention to provide a readily visible gage for indicating whether or not oil in the crankcase of a small engine is up to a prescribed level, said gage being located at the top of a compact but convenient funnel that comprises a more or less permanent part of the engine structure, and said gage comprising in effect a closure for the mouth of that funnel and also serving as a dipstick that can be used during replenishment of the oil supply for checking on whether an excessive amount of oil has been filled into the crankcase.

A further object of the invention is to provide an oil level indicator of the character described which does not require a person checking the oil level to incur any risk of coming into contact with crankcase oil or of dripping oil onto his clothing or shoes, and which is so located as to be easily seen and read even under adverse lighting conditions.

In considering the attainment of the objectives just set forth, it must be kept in mind that any sort of oil level gaging device must be designed for a particular engine model, inasmuch as the minimum oil level varies from one model engine to another; and therefore any structure intended for fulfilling these objectives is likely to be sold as original equipment on the engine itself. But the purchaser is buying an engine, not an oil gage, and price is therefore a very important criterion — often the principal one. This is to say that it is another and very important objective of the present invention to provide structure which achieves the objectives set forth above and does so at a low enough cost so that an engine equipped with that structure will still be attractively priced in the highly competitive market for small engines.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 1 is a side perspective view of a small gasoline engine equipped with a device embodying the principles of this invention;

FIG. 2 is a view on an enlarged scale, partly in side elevation and partly in longitudinal section, showing the device installed on an engine, only a small portion of the engine crankcase being illustrated; and FIG. 3 is a perspective view of the gage portion of the device.

Referring now to the accompanying drawings, the numeral 5 designates generally a typical small gasoline engine, incorporating a combined oil filler tube and oil gage 6 embodying the principles of this invention. The engine 5 will be recognized as being of a type widely used for powering lawn mowers and similar machines, having a vertical crankshaft 7 which rotates in a crankcase 8 that serves as an oil reservoir. The engine body that comprises the crankcase has an oil fill port 9 near its bottom, closely adjacent to an upwardly projecting side wall 10 of the crankcase. Above the crankcase is a conventional blower shroud 11 that directs cooling air across the engine body from a flywheel blower 12, and it will be observed that the blower shroud and the crankcase side wall 10 are necessarily so arranged in relation to the oil fill port 9 that the latter is not readily accessible.

Nevertheless, replenishment of the oil supply involves no inconvenience with the structure of the present invention, which comprises an elongated upright inlet tube or funnel member 14. The lower end portion of the funnel member is sealingly secured in the oil fill port 9, and the funnel member extends upwardly a distance to have its top end very conveniently accessible at a level just above the top of the blower housing. The top of the funnel member is closed by a cap 15 that also comprises a readily readable gage for indicating whether or not oil in the crankcase is up to the required level.

The funnel member 14 can be readily molded of plastic, in one piece. At its smaller diameter bottom end it is provided with an external thread that mates with the internal thread 16 which is more or less standard on the engine body oil fill port 9. As here illustrated, the thread on the funnel member is formed on a separate annular sealing adaptor 17 which snugly embraces the bottom portion of the funnel member and is secured in sealing relation thereto. The adaptor 17 is molded of an oil-resistant material such as neoprene that is fairly hard but also rather resilient so that it can maintain a good seal between the funnel member and the engine body while absorbing to a substantial extent the swinging oscillations which vibration imposes upon the rather top-heavy funnel member. To minimize swinging excursions of the funnel member, it can be anchored to the blower housing by means of a suitable bracket 18 that embraces the funnel member at a substantial distance above its bottom end and is secured to the blower housing by means of a sheet metal screw 19 or by one of the blower housing securement bolts. It will be understood that the funnel member will ordinarily be removed from the oil filler port 9 only when the engine is disassembled for service.

The cap 15 that normally closes the top of the funnel member also comprises means (described below) defining a suction chamber 21. As explained in more detail hereinafter, the interior of the suction chamber is communicated with a tube 22 that extends down through the funnel member to have its bottom end at the lowest safe level for the crankcase oil supply. The top wall 23 of the suction chamber comprises a diaphragm that is resiliently flatwise displaceable and is intended to be manually depressed and released for purposes of an oil check. Assuming that oil fills the crankcase to at least the prescribed minimum level, such depression and release of the top wall of the suction chamber causes oil to be sucked up into that chamber through the tube 22. The suction chamber has transparent side wall portions 24 through which oil, if present in the chamber, is readily visible.

Considering the combined cap and suction chamber means 15 in more detail, it comprises three main parts, namely, a cap member 25 that directly closes the top of the funnel member and provides the bottom wall 53 of the suction chamber, an annular side wall member 26 that comprises the transparent wall portions 24, and a cup-shaped diaphragm member 27 of resilient material, the end wall of which comprises the top wall of diaphragm 23 of the suction chamber.

The cap member 25 can be molded of a suitable relatively rigid plastic material, in one piece. It is in the main of inverted cup-shape, but its transversely extending end wall, which also serves as the bottom wall 53 of the suction chamber, has a central depression that defines an upwardly opening coaxial well 28. There are cooperating securement means on the funnel member and on the combined cap and suction chamber means; specifically, the annular side wall 29 of the cap member is internally threaded to mate with an external thread on the enlarged diameter top portion of the funnel member. Since a slightly sub-atmospheric pressure is normally maintained in the crankcase of an engine when it is operating, the cap member should have a sealing connection with the funnel member. To that end a resilient O-ring 30 is received in a shallow circumferential groove around the funnel member, just below the cap engaging threads thereon, and the lower edge of the cap member side wall is formed to have sealing engagement with that O-ring when the cap is in place.

The upwardly opening well 28 in the cap member serves as a seat for the lower end portion of a coiled expansion spring 31 that reacts against the suction chamber diaphragm wall 23 to bias the same upwardly to a normal raised position. From the bottom wall of the well 28 an integral nipple 32 projects coaxially downwardly to support the tube 22, and the interior of the suction chamber is of course communicated with the interior of the tube through this nipple.

A thin, circular skirt 33 projects coaxially downwardly from the end wall of the cap, in radially outwardly spaced relation to the well 28 therein, to closely engage the inner surface of the mouth of the funnel member. If oil is splashed upwardly to the top of the funnel member, the skirt 33 prevents it from crossing the rim of the funnel member and trickling down into the threaded connection between it and the cap member. The underside of the cap member is so formed, radially inwardly, of the skirt 33, that oil tends to run downwardly along the cap member and towards the nipple 32, to be guided back into the crankcase along the tube 22.

The side wall member 26, which can be molded in one piece of a suitable transparent plastic, is substantially ring-shaped. Its lower portion snugly embraces the side wall of the cap member; the cup-shaped diaphragm member 27 fits over its top portion; and its medial portion provides the transparent side wall 24 of the suction chamber. The cap member 25 and the transparent wall member 26 are formed to be assembled with one another with a telescoping snap fit whereby a shallow circumferential land 34 on the cap member is engaged in a mating groove in the lower portion of the transparent wall member. When so assembled, they sealingly compress between them a resilient gasket ring 35 that is confined between an upwardly facing shoulder on the cap member and a downwardly facing shoulder on the transparent wall member. To enable rotation to be imparted to the cap member through the transparent member, the portions of those two members that extend axially between the sealing ring 35 and the retaining land 34 are formed with shallow, vertically extending lands and grooves that closely mate with one another, as indicated at 36. Vertically extending ridges or ribs 37 on the exterior surface of the transparent member enhance its appearance and facilitate gripping it for screwing the cap onto and off of the funnel member.

The cup-shaped diaphragm member 27 that fits over the top portion of the transparent member is molded of a rather supple and resilient rubber-like material. Around the rim of its side wall it has a radially inwardly projecting land 39 that is received in a closely fitting circumferential groove in the exterior surface of the transparent member, spaced just below the upper edge thereof. A snugly fitting retaining ring 40, which can be molded of substantially rigid plastic, embraces the side wall of the diaphragm member to confine it in sealing engagement with the transparent member.

The connection between the spring 31 and the supple end wall or diaphragm 23 of the diaphragm member 27 comprises a substantially rigid spring retainer 40 that can be molded of plastic, in one piece. The spring retainer has a flat top 41 which flatwise underlies a substantial part of the diaphragm 23 and against the underside of which the spring reacts. A depending central tit 42 on the diaphragm projects through a closely fitting central hole in the top of the spring retainer to hold the latter centered. A coaxial skirt 43 projects downwardly from the flat top of the spring retainer to embrace the uppermost coils of the spring 31 and thus hold the spring centered.

Preferably the skirt 43 of the spring retainer has a circumferential flange 44 projecting radially outwardly therefrom at its bottom. In a radially outwardly opening groove in the outer edge of this flange is confined a resilient wiper ring 45 (of neoprene or the like) which wipingly engages the transparent wall member. Because the top of the spring retainer is confined between the spring 31 and the diaphragm wall 23 of the suction chamber, the wiper ring 45 is constrained to move in unison with up and down displacement of the diaphragm, and in doing so the ring 45 wipes off of the inner surface of the transparent member any residual oil that may be clinging to it from a previous oil check.

It will be understood that the inner surface of the transparent wall member is cylindrical through at least the portion thereof that is wiped by the wiper ring 45, which portion extends from the lower edge of the diaphragm member 27 to the top of the cap member 25 and provides a window through which oil in the suction chamber can be seen. The stroke of the diaphragm wall 23 of the suction chamber is about equal to the axial height of that window, and it will be noted that when the diaphragm wall is in its normal position, towards which it is urged by the spring 31, the wiper ring is just above the top of the window area.

In addition to the clear view of the interior of the suction chamber that is afforded by the action of the wiper ring, the presence or absence of oil in the suction chamber is rendered more easily visible by virtue of the cap member 25 being made of a white plastic or a plastic of some other light color that contrasts with the color of oil. It will be apparent that even in poor lighting conditions an oil check is facilitated by the accessible location of the suction chamber at a level slightly above the main part of the engine.

If no oil appears in the suction chamber when the diaphragm wall 23 is depressed and released for an oil check, the oil in the crankcase is obviously below the level of the bottom of the tube 22, and oil needs to be added. When the cap 15 is removed from the funnel member 14, no difficulty will ordinarily be experienced in pouring oil directly into the wide mouth of the funnel member. However, the crankcase should not be overfilled, and to provide an accurate check on oil quantity for oil levels above the prescribed minimum, the tube 22 is arranged to be used as a dipstick.

The tube 22 comprises a length of resilient, oil resistant, tubing material 46 such as neoprene, secured to the nipple 32 as by means of a resilient clamping ring 47. The lower end portion of the tube comprises a tubular dipstick fitting 48 which is molded of a rigid plastic material light enough in color to contrast well with the color of oil. The upper end portion of the dipstick fitting is telescoped into the lower end portion of the tubing 46 and is secured by means of a clamping ring 49 embracing the tubing. To denote the maximum oil level to which the crankcase should be filled, the dipstick fitting is provided with suitable indicia which can comprise a narrow circumferential land 50.

As it is drawn up through the relatively small diameter lower portion of the funnel member, the lower portion of the dipstick fitting should be prevented from having wiping engagement with the funnel member by which oil could be removed from it. To that end the dipstick fitting is provided with integral, circumferentially spaced, radially projecting rigid fingers 52, preferably located just below its connection with the tubing 46, which fingers can engage the inner surface of the funnel member to hold the body of the dipstick fitting spaced therefrom.

From the foregoing description taken with the accompanying drawings it will be apparent that this invention provides structure that simplifies and facilitates the filling of oil into the crankcase of a small engine, provides for a quick, easily made and reliable check on whether or not the oil level is up to a prescribed minimum, and allows the exact level of oil in the crankcase to be accurately determined to prevent overfilling.

Those skilled in the art will appreciate that the invention can be embodied in forms other than as herein disclosed for purposes of illustration.

The invention is defined by the following claims

We claim:

1. A device for indicating whether oil in the crankcase of an engine is above or below a predetermined level, said device being of the type that comprises a tube having a lower end normally in the crankcase at said level and having an upper end communicated with a suction chamber that provides for withdrawal of a small quantity of oil out of the crankcase (if oil therein is above said level) and to a location at which the withdrawn oil is visible, said device being characterized by:
   A. said suction chamber being defined by means comprising
      1. a bottom wall to which the upper end portion of said tube is attached and through which the interior of the tube is communicated with the interior of the suction chamber,
      2. a substantially annular side wall having a bottom portion sealingly connected with said bottom wall, and
      3. a flatwise upwardly and downwardly displaceable top wall which is sealingly connected with an upper portion of said side wall;
   B. said side wall
      1. being at least in part transparent between its connections with said bottom wall and said top wall, and
      2. having a cylindrical interior surface portion between said connections;
   C. said top wall being yieldingly biased upwardly to a normal position from which it can be manually displaced downwardly;
   D. a resilient circular wiper having an axially slidable wiping fit with said interior surface portion of the side wall; and
   E. means providing a connection between said wiper and said top wall whereby said wiper is constrained to move up and down with said top wall so that manual downward displacement of the top wall causes the wiper to remove residual oil from said cylindrical interior surface portion.

2. The device of claim 1 wherein said top wall comprises a supple diaphragm and is biased upwardly by means of a coiled expansion spring that has its axis upright and reacts downwardly against said bottom wall, further characterized by:
   said means providing a connection between said wiper and said top wall comprising a rigid spring retainer having
      1. a flat top portion which flatwise underlies said diaphragm and the underside of which is engaged by the upper end of said spring, and through which upward and downward forces are transferred between the spring and the diaphragm,
      2. a skirt depending from said top portion and embracing the upper portion of the spring to steady the same, and
      3. a circumferential flange on said skirt, projecting radially outwardly therefrom and having said wiper secured to its outer edge.

3. The device of claim 1, in combination with an elongated upright funnel member that has a lower end sealingly secured in an oil fill port in an engine crankcase and has a larger diameter upper end portion accessibly located at a substantial distance above said port, further characterized by:
   1. cooperating means on said suction chamber defining means and on the upper portion of said funnel member, for removably securing the suction chamber defining means to the funnel member to close the upper end thereof
   2. said tube having an outside diameter substantially smaller than the smallest inside diameter of the funnel member; and
   3. a plurality of circumferentially spaced radially outwardly projecting fingers on the tube, near its bottom end, to prevent oil from being wiped off of the exterior of the tube as it is drawn up through the funnel member, thereby allowing the tube to serve as a dipstick for reading levels of crankcase oil that are above said predetermined level.

4. The device of claim 3, further characterized by:
   F. an indicum on said tube, near its bottom end, denoting the maximum level to which oil should be filled into the crankcase.

5. An oil filler and gage for an engine having a crankcase in which oil should normally be maintained above a predetermined level and into which oil is filled through an inlet port that is at a small distance above said level, said oil filler and gage comprising:
   A. an axially elongated funnel member having a bottom end portion removably securable in said inlet port and having an enlarged inside diameter at its top end;
   B. means defining a suction chamber having
      1. a substantially rigid bottom wall,
      2. a substantially rigid transparent side wall portion, and
      3. a top wall portion displaceable flatwise upwardly and downwardly relative to the remainder of the suction chamber and biased upwardly to a normal position;
   C. cooperating securement means on the top of said funnel member and on said suction chamber means, below its transparent side wall portion, for removably securing the suction chamber means to the top of the funnel member to close the latter;
   D. a tube secured to the bottom wall of said suction chamber means and projecting downwardly therefrom, said tube
      1. being of a length to have its bottom end at said level when the funnel member is secured in said inlet port and the suction chamber means is secured to the top of the funnel member,
      2. having its interior communicated through said bottom wall with the interior of the suction chamber so that upon manual depression and release of said top wall portion (when oil in the crankcase is above said level) oil is sucked up into the suction chamber to be visible through said transparent wall portion, and
      3. having an outside diameter substantially smaller than the narrowest inside diameter of said funnel member; and
   E. a plurality of circumferentially spaced radially projecting fingers fixed to said tube near the bottom end thereof to prevent oil on the exterior of the tube from being wiped off of the same as the tube is drawn lengthwise through the funnel member, so that the tube can be used as a dipstick for measuring crankcase oil quantities above said level.

6. The oil filler and gage of claim 5, further characterized by:
   F. the transparent side wall portion of said suction chamber means having a cylindrical interior surface;

G. a resilient circular wiper having an axially slidable wiping fit with said cylindrical surface; and H. means providing a connection between said wiper and said top wall portion whereby said wiper is constrained to move up and down with said top wall portion so that depression of the top wall portion causes the wiper to remove residual oil from said transparent wall portion.

7. In combination with an upright funnel member having a lower end portion adapted to be sealingly secured in a crankcase oil fill port of a small engine and having a larger diameter upper end portion adapted to be accessible at a distance above said port:

A. means providing a readily removable closure for the upper end portion of said funnel member and defining a suction chamber above the funnel member, said means comprising
1. substantially rigid structure defining
   a. a transversely extending wall portion adapted to overlie the top of the funnel member and providing a bottom wall for said suction chamber,
   b. a first substantially annular wall portion projecting downwardly from said transversely extending wall portion and adapted to embrace the upper portion of the funnel member, and
   c. a second substantially annular wall portion projecting upwardly from said transversely extending wall portion and providing a side wall for said suction chamber, said second substantially annular wall portion being transparent, and
2. a diaphragm member that is sealed to the upper portion of said second substantially annular wall portion all around the same, and provides an upwardly and downwardly displaceable top wall for said suction chamber;

B. a coiled expansion spring confined in said suction chamber with its axis upright and having its lower end portion received in an upwardly opening well in said transversely extending wall member;

C. a spring retainer
1. having a substantially flat portion which flatwise underlies said top wall of the suction chamber and against which the upper end of said spring reacts,
2. said spring retainer having a concentric skirt portion depending from said flat portion and embracing the upper end portion of said spring to steady the same; and D. a tube secured to said transversely extending wall portion and projecting downwardly therefrom to normally have its lower end at said level, the interior of said tube being communicated with the interior of said suction chamber through said transversely extending wall portion, so that upon downward depression and release of said displaceable top wall, oil can be drawn up from a crankcase (if it is above said level therein), into said suction chamber, to be visible through said second substantially annular wall portion.

8. The structure of claim 7 wherein the top surface of said transversely extending wall portion has a light color, to contrast with the color of oil in the suction chamber and thus render the presence of such oil readily visible.

9. The combination of claim 7 wherein said second substantially annular wall portion has a cylindrical interior surface, further characterized by:
1. a circumferential flange on said skirt portion of the spring retainer, projecting radially outwardly therefrom; and
2. a resilient wiper ring secured to the radially outer edge of said flange and having wiping engagement with said cylindrical interior surface, for wiping residual oil off of the same upon downward displacement of said top wall of the suction chamber.

10. The combination of claim 7 wherein said diaphragm member is substantially cup-shaped, is formed in one piece, of resiliently supple material, and has its side wall surrounding the upper portion of said second substantially annular wall portion, further characterized by:
a clamping ring surrounding said side wall of the diaphragm member to hold the same in snug sealing engagement with said second substantially annular wall portion.

11. The combination of claim 7 wherein said tube has an indicium on its lower portion that denotes the highest level to which oil should be filled into a crankcase to enable the tube to be used as a dipstick, further characterized by:
a plurality of circumferentially spaced, radially outwardly projecting fingers on the lower portion of said tube to prevent oil from being wiped off of that portion of the tube as it is drawn upwardly through the funnel member.

* * * * *